US008364311B2

(12) United States Patent
Heracles

(10) Patent No.: US 8,364,311 B2
(45) Date of Patent: Jan. 29, 2013

(54) DRIVER ASSISTANCE SYSTEM OR ROBOT WITH DYNAMIC ATTENTION MODULE

(75) Inventor: Martin Heracles, Obertshausen (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 317 days.

(21) Appl. No.: 12/763,715

(22) Filed: Apr. 20, 2010

(65) Prior Publication Data

US 2010/0305755 A1 Dec. 2, 2010

(30) Foreign Application Priority Data

May 28, 2009 (EP) .................................... 09161379

(51) Int. Cl.
*B60W 30/85* (2012.01)
*B60W 30/09* (2012.01)
*B60W 30/95* (2012.01)
*G08G 1/16* (2006.01)

(52) U.S. Cl. ............ 700/253; 700/255; 701/28; 901/47; 382/224; 706/20

(58) Field of Classification Search .................. 700/253, 700/250, 255, 245; 701/28, 1, 519, 523; 901/47, 1; 382/224; 706/20, 16, 15
See application file for complete search history.

(56) References Cited

U.S. PATENT DOCUMENTS

| 7,606,777 | B2 * | 10/2009 | Serre et al. ........................ 706/20 |
| 7,668,797 | B2 * | 2/2010 | Kuvich ............................ 706/62 |
| 7,765,029 | B2 * | 7/2010 | Fleischer et al. ............. 700/250 |
| 7,844,556 | B2 * | 11/2010 | Edelman et al. ................ 706/15 |
| 2007/0011118 | A1 * | 1/2007 | Snook et al. .................... 706/16 |
| 2009/0297048 | A1 * | 12/2009 | Slotine et al. ................. 382/224 |

FOREIGN PATENT DOCUMENTS

| EP | 2028632 A2 | 2/2009 |
| EP | 2028632 A3 | 4/2009 |

OTHER PUBLICATIONS

EP communication/European Search Report, Oct. 30, 2009, a total of 7 pages.
Jannik Fritsch et al., "Towards a Human-like Vision System for Driver Assistance", 2008 IEEE Intelligent Vehicles Symposium, Jun. 4-6, 2008, pp. 275-282.
Wilfried Enkelmann et al., Obstacle detection by evaluation of optical flow fields from image sequences, Image and Vision Computing, vol. 9, No. 3, Jun. 1991, pp. 160-168.
L. Itti, C. Koch, and E. Niebur, "A Model of Saliency-Based Visual Attention for Rapid Scene Analysis," IEEE Transactions on Pattern Analysis and Machine Intelligence, vol. 20, No. 11, pp. 1254-1259, 1998.
L Itti, "Models of Bottom-Up Attention and Saliency", Neurobiology of Attention, 2005, pp. 1-11.

(Continued)

*Primary Examiner* — Eric Culbreth
*Assistant Examiner* — Keith Frisby
(74) *Attorney, Agent, or Firm* — Squire Sanders (US) LLP

(57) ABSTRACT

The invention relates to a vision-based attention system, comprising:
  at least one vision sensor,
  at least one image processing module processing an output signal of the vision sensor in order to generate at least one two-dimensional feature map,
  a dorsal attention subsystem generating a first saliency map on the basis of the at least one feature map, the saliency map indicating a first focus of attention for the driver assistance system,
  a ventral attention subsystem, independent to the dorsal attention subsystem, for generating a second saliency map on the basis of at least one feature map, which can be the same as the one used for the dorsal attention system or a different one,
the second saliency map indicating unexpected visual stimuli.

11 Claims, 5 Drawing Sheets

Basic structure of the proposed system architecture

OTHER PUBLICATIONS

F Orabona, G Metta, G Sandini, "Object-Based Visual Attention: a Model for a Behaving Robot", IEEE Computer Vision and Pattern Recognition—Workshops, 2005, pp. 1-8.

W Kienzle, FA Wichmann, B Scholkopf, MO Franz, "A Nonparametric Approach to Bottom-Up Visual Saliency", Advances in Neural Information Processing Systems, 2007, pp. 1-8.

D Gao, N Vasconcelos, "Bottom-Up Saliency is a Discriminant Process", IEEE International Conference on Computer Vision, 2007, pp. 1-6.

U Rutishauser, D Walther, C Koch, P Perona, "Is Bottom-Up Attention Useful for Object Recognition?", Computer Vision and Pattern Recognition, 2004. CVPR 2004, pp. 1-8.

Sang-Bok Choi, "Biologically Motivated visual Attention System Using Bottom-Up Saliency Map and Top-Down Inhibition", Neural Informaiton Processing-Letters and Reviews, vol. 2, No. 1, Jan. 2004, pp. 19-25.

V. Navalpakkam, L. Itti, "Modeling the Influence of Task on Attention", Vision Research, vol. 45, No. 2, Jan. 2005, pp. 205-231.

A. Oliva, et al., "Top-Down Control of Visual Attention in Object Detection", Image Processing, 2003, pp. 1-4.

S. Frintrop, "Vocus: A Visual Attention System for Object Detection and Goal-Directed Search", pp. 1-217, Jan. 9, 2006.

V. Navalparkkam, L. Itti, "A Goal Oriented Attention Guidance Model", Lecture notes in Computer Science, 2002, pp. 1-9.

R. Peters, L. Itti, "Beyond Bottom-Up: Incorporating Task-Dependent Influences Into a Computational Model of Spatial Attention", CVRP 2007, pp. 1-8.

B. Rasolzadeh, M. Bjorkman, J.O. Eklundh, "An Attentional System Combining Topdown and Bottom-Up Infuences", Lecture Notes in Computer Science, 2007, NUMB 4849, pp. 123-140.

M. Cerf, J. Harel, W. Einhauser, C. Koch, "Predicting Human Gaze Using Low-Level Saliency Combined with Face Detection", Advances in Neural Information Processing Systems, 2008, pp. 1-8.

B. Khadhouri and Y. Demiris, "Compound Effects of Top-Down and Bottom-Up Influences on Visual Attention During Action Recognition", International Joint Conference on Artificial Intelligence, 2005, pp. 1-6.

T. Michalke, J. Fritsch, C. Goerick, "Enhancing Robustness of a Saliency-Based Attention System for Drive Assistance", in the 6th International Conference on Computer Vision Systems, 2008, pp. 1-12.

J. Fritsch et al., "Towards a Human-Like Vision System for Driver Assistance", in Proc. of the IEEE Intelligent Vehicles Symposium, 2008, pp. 1-8.

L. Itti and P. Baldi, "A Principled Approach to Detecting Surprising Events in Video", CVPR 2005, vol. 1, pp. 1-7.

T. Xu et al., "Looking at the Surprise: Bottom-Up Attentional Control of an Active Camera System", Contol, Automation, Robotics and Vision, ICARCV 2008, pp. 1-6.

* cited by examiner

Fig. 1 Basic structure of the proposed system architecture

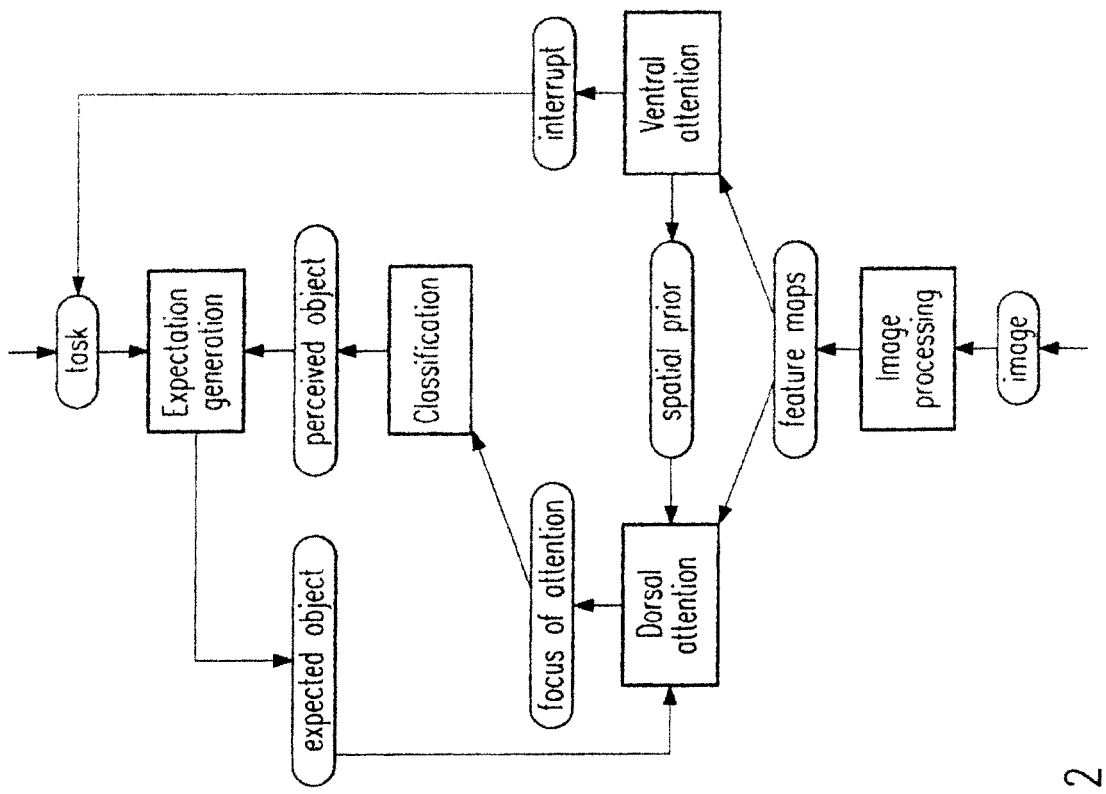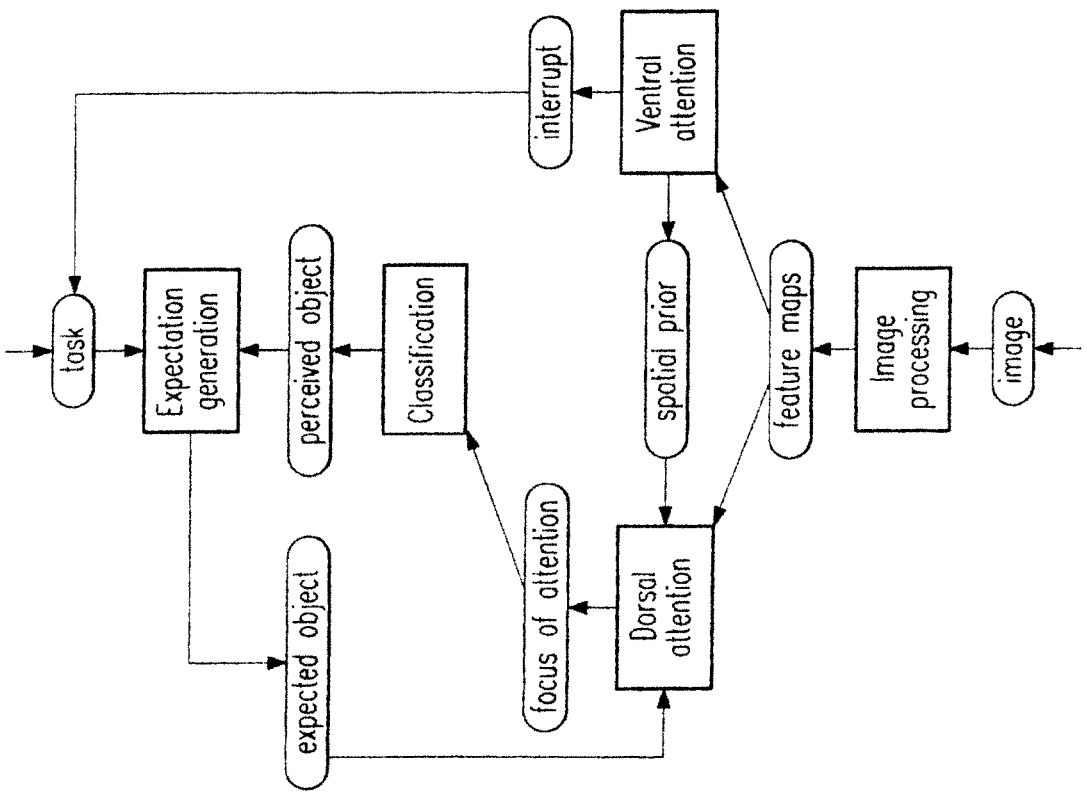
Fig. 2

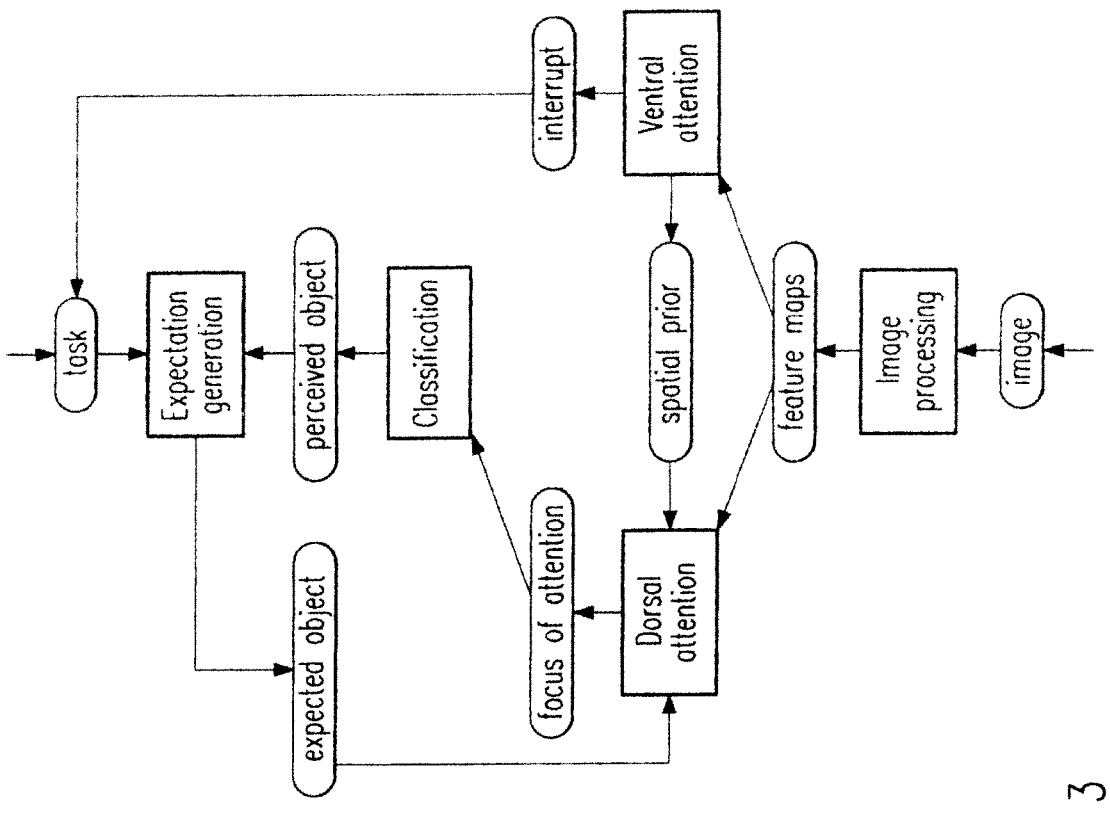
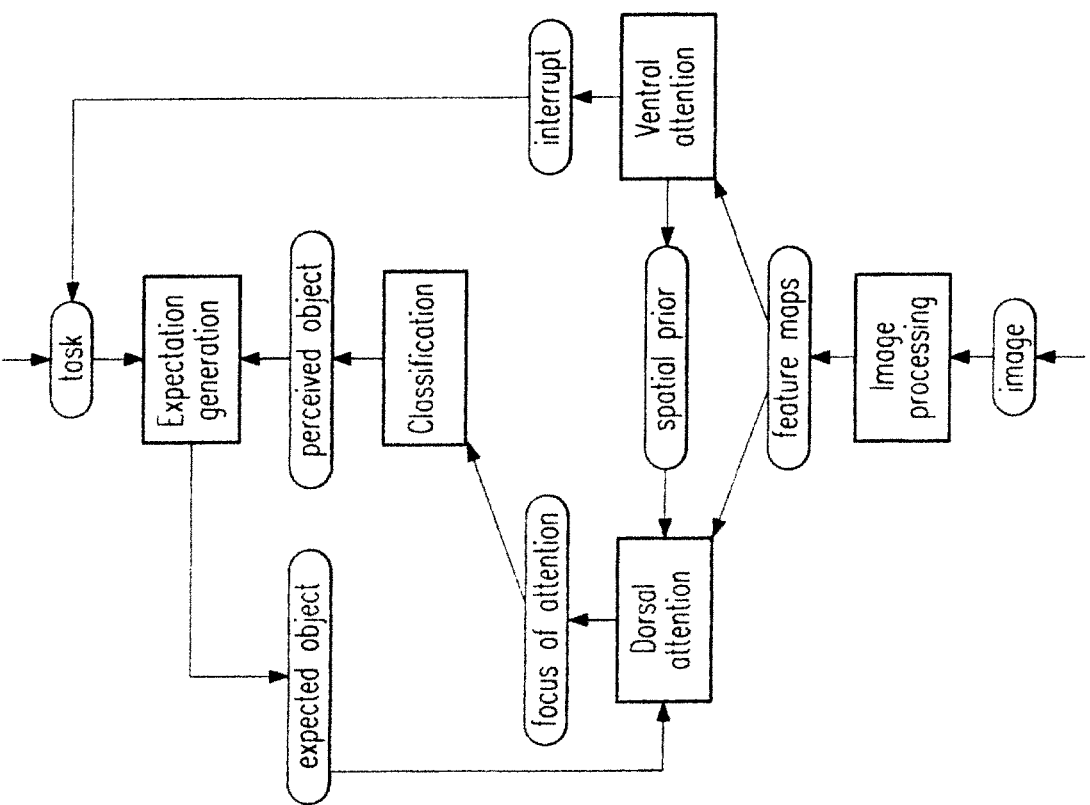
Fig. 3

DRIVER ASSISTANCE SYSTEM OR ROBOT WITH DYNAMIC ATTENTION MODULE

BACKGROUND OF THE INVENTION

This invention relates to the domain of advanced driver assistance systems and autonomous robots. Driver assistance systems are automated technical devices, typically involving sensors such as cameras, laser scanners or infrared sensors, which are mounted to vehicles (cars, motorbikes, planes, boats, trains, . . . ). Their purpose is to monitor the environment of the vehicle thus equipped and assist the driver while driving in real-world traffic environments. "Assisting" thereby can be the control of an actuator of the vehicle (brakes, steering, accelerator, . . . ) or at least the generation of visual or audio signals assisting the driver.

Examples include lane keeping systems, braking assistants and distance monitoring devices, just to name a few. The invention proposes a driver assistance system that focuses on visual processing and is therefore equipped e.g. with a stereo camera as sensor device.

TARGET OF THE INVENTION

In the context of driving in real-world traffic environments, it is important for the driver to be aware of all objects and events in the vicinity that are relevant for driving, in order to drive safely. These include objects that are related to driving, such as traffic lights, traffic signs and lane markings, for example, as well as other traffic participants, e.g., cars, bicyclists and pedestrians. A prerequisite for being aware of such objects and, more importantly, for properly reacting to them is that the driver is able to detect them first. For familiar objects that are directly related to driving and which are typical for traffic environments, such as traffic lights and other cars, for example, it is likely that the driver will spot them because he/she is actively looking for them. In contrast, it is more difficult for the driver to also detect objects that are not his/her current focus of attention, a phenomenon known as inattentional blindness. Such objects, however, may be of high behavioral relevance for the driver as well: If a ball rolls unexpectedly onto the street, for instance, the driver has to immediately react to it by braking in order not to collide with it, and also will start to actively look for a child running after the ball. In fact, objects that the driver does not expect and, as a consequence, does not actively look for may often pose critical situations in which a driver assistance system can be valuable.

In the following it is explained what is to be understood by the terms dorsal and ventral attention sub-system to prevent confusion regarding the terms "ventral", "dorsal", "attention system", "what" and "where":

Biologically, there is a "ventral (visual) pathway" and "dorsal (visual) pathway", and a "ventral attention network" and a "dorsal attention network". Apart from the fact that the dorsal attention network largely is part of the dorsal visual pathway (or, to be more exact, is built on top of the dorsal visual pathway, but the boundaries are not too sharp), all these are different from each other, referring both to their locations as well as their functions. E.g. the document by Fritsch refers to a ventral visual pathway and a dorsal visual pathway, which are also called "what" and "where" pathway due to their respective function.

The attention system of the invention, in contrast, uses a dorsal attention network and a ventral attention network. The ventral attention network, however, is completely different from the ventral (or "what") pathway—despite its name. The ventral pathway consists of regions located in the temporal lobes, while the ventral attention network consists of regions above the temporal lobe and in frontal lobe, and only in the right hemisphere. The dorsal attention sub-system hence models the dorsal attention network of the brain, while the ventral attention sub-system models the ventral attention network of the brain.

The invention relates to an automated assistance system detecting such unexpected but highly behavior-relevant objects and situations by means of a vision-based dynamic attention system which operates on stereo camera images that monitor e.g. the space in front of the vehicle.

PRIOR ART

The state of the art in computational attention systems can be divided into purely bottom-up saliency models of attention, top-down saliency models of attention, and models that integrate both bottom-up saliency and top-down saliency. Examples of bottom-up saliency models and their application include [1], [2], [3], [4], [5], [6], [7], and [8]. Such approaches typically consider a variety of different image features, such as pixel color, pixel intensity, orientation of local edges and local motion, for example. For each feature, several feature maps are computed at different spatial scales or image resolutions, where each feature map indicates for each location in the image how distinctive the corresponding feature is at that location. This is typically achieved by image processing mechanisms based on center-surround principles. The invention employs a bottom-up saliency model similar to the cited ones as a building block, however, it adds additional saliency models to this bottom-up saliency model and thereby goes beyond the limited capabilities of bottom-up saliency models.

Top-down saliency models, examples of which include [9], [10], [11], [12], [13], [14], [15], [16], [17], [18], and [19], basically consist of the same feature map apparatus, however, in contrast to bottom-up saliency models these feature maps are combined in a dynamic way such that different combinations of features can be enhanced. The advantage over bottom-up saliency models lies in the fact that the top-down saliency model can be tuned to different objects, characterized by different feature combinations, even if they are not distinctive in the bottom-up saliency map. In addition to a bottom-up saliency model, the invention also employs a top-down saliency model as another building block.

In "Towards a Human-like Vision Sensor for Driver Assistance", Fritsch et al. describe a driver assistance system, which employs a dorsal and ventral pathway to detect a category and the position of an object ("what" and "where" processing paths). After object recognition (the "what" of the object), the position of an object and its label are stored in a short term memory in order to track the objects in subsequent images (tracking the "where" of the object). Additionally, the object distance is calculated for all objects in the short term memory based on measurements obtained from the radar. Based on the distance information, a danger level is calculated and a warning message is generated if necessary.

According to this document, a "where" path performs the tracking, but the assessment of danger and the generation of a warning are both computed from the objects in a S™ (short term memory). A danger and warning computation is based on the distance to previously seen (and already classified) objects in the STM that are being tracked (denoted as "known objects" for the "where" pathway).

In contrast, the ventral attention sub-system of the present invention does not rely on known objects or regions, or things that have been seen before. Instead, it generates a signal if a feature maps show something that violated its expectations (the expectations come from internal models, which the BU- and TD-saliency do not have).

Document EP 2 028 632 A1 describes a driver assistance system for guiding a vehicle in stop-and-go traffic situations.

The invention adds a third saliency model to bottom-up and top-down saliency in which the saliency of features is defined by the degree of mismatch between expectations about the features and the actual observations. While, in principle, this model has similarities with the so-called surprise metric proposed in [20] and [21], no system has been proposed or built so far that combines bottom-up saliency, top-down saliency and a third saliency model based on surprise in the above sense as three independent, parallel processes. In [20] and [21], for example, the surprise metric has been directly applied to the output of the bottom-up saliency model, thus replacing the bottom-up component. In the invention, in contrast, the three saliency models are equal and interact with each other.

It is the object of the invention to propose an improved automated method and system for assisting a driver of a vehicle especially as to unexpected events.

This object is achieved by means of the features of the independent claims. The dependent claims develop further the central idea of the invention.

According to a first aspect the invention proposes a vision-based attention system e.g. for a driver assistance system or an autonomous robot, comprising:
- at least one vision sensor,
- at least one image processing module processing an output signal of the vision sensor in order to generate at least one two-dimensional feature map,
- a dorsal attention subsystem generating a first saliency map on the basis of the at least one feature map, the saliency map indicating a first focus of attention for the driver assistance system,
- a ventral attention subsystem, arranged independently to the dorsal attention subsystem and not relying on a signal generated by the dorsal attention subsystem, for generating a second saliency map on the basis of the at least one feature map, which can be the same as the one used by the dorsal attention subsystem or a different one. The second saliency map indicates unexpected visual stimuli.

"Unexpected visual stimuli" are visual stimuli in the input field of the vision sensor which remain after deleting from the input field of the vision sensor
- visual stimuli which are predicted ("expected") from a previous visual input and the sensed ego-motion of the system (the ego-motion can be sensed e.g. using internal sensors or a satellite-based sensor), and
- pre-stored models of visual stimuli, which can be e.g. learned to be expected.

The feature map of the ventral attention subsystem may represent the optical flow of the vision sensor, the optical flow being a two dimensional map in which each pixel is assigned a velocity vector representing a motion between two different sampled images.

The ventral attention subsystem has a priority over the attention produced by the dorsal attention subsystem in case an unexpected stimulus is detected.

The unexpected visual stimuli in the second saliency map may be generated based on the difference between the expected direction and the sensed direction of the optical flow.

The expected direction of the optical flow may be set as a radial flow around a centre point in the input field of the vision sensor.

The dorsal attention subsystem may comprise a bottom-up saliency module.

The dorsal attention subsystem may comprise a top-down saliency module.

A further aspect of the invention relates to a vehicle, being provided with a driver assistance system as defined above, wherein the driver assistance system generates an output signal for an actuator of the vehicle, such as e.g. the steering, braking means and/or accelerating means.

Further features, advantages and objects of the invention will now become evident when going through the following detailed description of embodiments of the invention, when taken in conjunction with the figures of the enclosed drawings:

FIG. 1 shows a basic structure of a system according to the present invention,

FIG. 2 illustrates the task-induced expectation of a car in front modulates the dorsal attention sub-system by means of top-down feature weights (left). As a result, the system's focus of attention is indeed on the car in front, which is confirmed by the classification sub-system (right). This represents a stable state of the system's attentional dynamics.

FIG. 3 explains the case of the unexpected motion of a ball rolling onto the street is detected by the ventral attention sub-system and has triggered a reorienting response (left). When the ball is recognized by the classification subsystem, reorienting is over and the formerly unexpected stimulus has become something known. It can then be actively focused by the system by means of top-down feature weights (right), which represents a stable state of the system's attentional dynamics again.

FIG. 4 gives an overview of our technical system implementing the invention.

DETAILED EMBODIMENT OF THE INVENTION

Under normal conditions, i.e. as opposed to experimental setups, attention is strongly driven by top-down information such as the current task or goal. Driving a car is an example of a situation in which this is true. In state-of-the-art computational models of attention, this kind of attention is implemented by the well-known concept of top-down saliency, which allows for selective tuning of various low-level feature detectors towards objects that are relevant for the current task (mostly search tasks). While this enables fast detection of task-relevant objects, a drawback is that objects to which the feature detectors are currently not tuned cannot be detected. However, objects can be highly relevant for the system and have to be detected and properly dealt with even if they are not relevant for the current task of the system. In the driving scenario, for example, a ball may roll onto the street while the system is engaged in a distance keeping task involving the car in front.

Apart from top-down saliency, state-of-the-art computational models of attention also incorporate the well-known concept of bottom-up saliency. In contrast to top-down saliency, bottom-up saliency is unspecific in that it is independent of the task currently being pursued by the system, and it only takes into account the image data itself. This way, bottom-up saliency can be used to detect objects and locations in the image that somehow "pop out" in terms of the implemented features. An example of such objects that can be detected by means of bottom-up saliency are red traffic lights. In general, however, many objects that are highly relevant for the system but not relevant for the current task in the above sense (ball rolling onto the street) do not sufficiently "pop out", hence cannot be reliably detected by bottom-up saliency neither.

For this reason, the invention proposes to incorporate a third computational model of attention besides top-down and bottom-up saliency that serves as a detector for novel/unexpected stimuli that are not typical for the current situation. In one implementation example, this is computed at the level of low-level features. For example, while driving along a straight road, radial optical flow is the typical case and thus expected. Non-radial optical flow as caused by a ball rolling onto the street while driving is unexpected, hence can be used to detect the ball. The invention proposes the incorporation of this third attention model for novelty detection into known computational models of attention that include of top-down and bottom-up saliency, and in the way the three attention models interact within the system.

The system may learn the "typical" feature distributions in different situations by unsupervised learning mechanisms, which is possible because they are readily and abundantly observable (as opposed to the unexpected/untypical features, which cannot be learned like this because of their rare occurrence).

System Architecture

Figure 1:
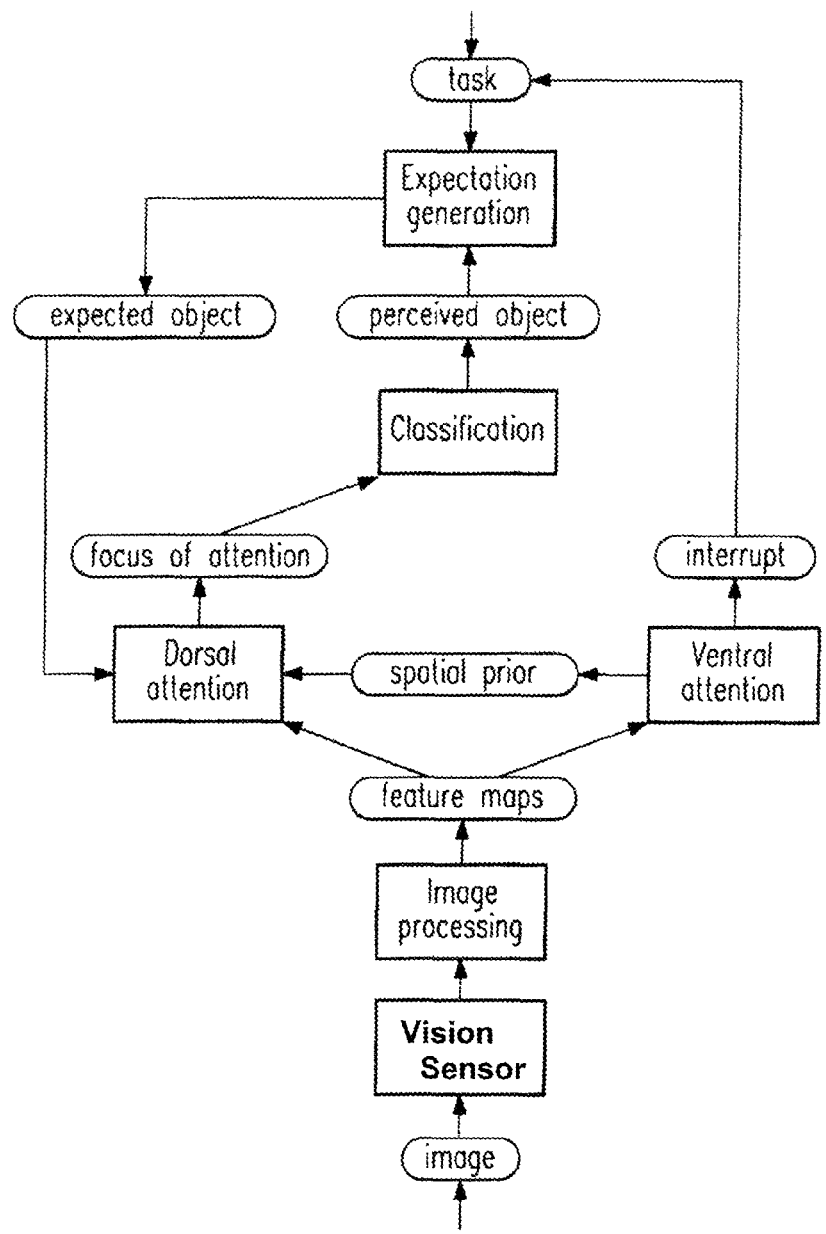

The basic structure of the proposed system architecture is depicted in FIG. 1. It consists of five sub-systems:

Image processing module,
Dorsal attention module,
Ventral attention module,
Classification module, and
Expectation generation module.

The sub-system for image processing computes a variety of two-dimensional feature maps $$f: W \times H \to [0,1]$$

given the input image $$i: W \times H \to [0,1]$$

where $W, H \in \mathbb{N}$ denote the width and height of i in pixels, respectively, and X is short for the set $\{0, \ldots, X-1\}$, for each $X \in \mathbb{N}$.

Each feature map concentrates on a certain feature such as oriented contrast edges or optic flow, for example. The dorsal attention sub-system integrates the feature map to a single saliency map $$s_{dorsal}: W \times H \to [0,1]$$

from which it then computes a certain 2D position $$p_{FoA} \in W \times H$$

in image coordinates, typically at the global maximum. This 2D position pFoA represents the current focus of attention of the system, i.e. subsequent processing steps do not operate on the entire image but concentrate on pFoA and its local neighborhood.

Consequently, the sub-system for classification considers a local image patch $$R_{pFoA} \subset W \times H$$

and, based on its visual appearance, computes an estimate $c_{perceived} \in C$ of the object category to which $R_{pFoA}$ corresponds, where $C \in \mathbb{N}$ is the total number of object categories known to the system. The expectation generation sub-system closes the loop by generating an expected object category $c_{expected} \in C$, given $c_{perceived}$ or a task t. The expectation $c_{expected}$ is then propagated to the dorsal attention sub-system where it influences the way the feature maps are combined, and hence the focus of attention pFoA.

Like the dorsal attention sub-system, the ventral attention sub-system also operates on the feature maps and integrates them to a single saliency map $$s_{ventral}: W \times H \to [0,1]$$

It integrates them in a different way, however, since its purpose is not directly to compute the focus of attention $p_{FoA}$ but to detect stimuli that contradict the expectations of the system given the current situation, such as unexpected motions, for example. In this case, it generates an interrupt event $x \in \{0,1\}$ that stops the currently pursued task t and, at the same time, it provides a coarse spatial prior $p_{unexpected} \in W \times H$ to the dorsal attention sub-system, thereby enabling the system to reorient to the unexpected stimulus.

In an embodiment, the system architecture further includes at least one vision sensor, which captures an image, as depicted in FIG. 1. The image processing module processes an output signal of the vision sensor in order to generate a plurality of two-dimensional feature maps f.

It should be noted that our focus is not so much on the individual sub-systems themselves. Consequently, we employ existing state-of-the-art algorithms for their implementation.

Instead, we are interested in their dynamic interplay within the context of the system and, in particular, how this enables the system to reorient to unexpected stimuli detected by the ventral attention. This goes beyond the task-oriented notion of attention employed in our previous system [12]. In order to illustrate the attentional dynamics, we consider an intuitive example in the following section.

Regarding the indication of an unexpected visual stimulus, the BU-saliency map detects stimuli or features that are not in the scope of the TD-saliency map, which is tuned to features that are typical (or "expected") of the object that is currently relevant for the task of the system. In that sense, the BU-saliency detects "unexpected" features. The ventral attention sub-system detects a special kind of unexpected features: It does not have knowledge about which features are typical of a certain object of interest, like the TD-saliency has, but instead it has knowledge about which features are typical of the whole scene the system is currently in. This kind of "unexpected" features is general, and while the TD-saliency can only search for one object class at a time, the ventral attention system can have many concurrent expectations about typical features in different parts of the scene which it constantly monitors and generates a warning in case any one of them is being violated.

The dorsal attention system contains a TD-saliency, which can be tuned to detect objects of interest by taking into account knowledge about which features are typical to objects (unlike the ventral attention system, which also has knowledge about which features are typical, but for the whole situation rather than for certain objects). Note that the TD-saliency (all technical TD-saliencies that have been described so far) can only be tuned to one object class at a time, because they are very specific.

The ventral attention sub-system typically operates on the same feature maps as the dorsal attention sub-system, but takes into account internal models of what are typical features. These models can be learned from experience, from statistics, for example, because typical features are such that can be observed often, as opposed to untypical or unexpected features that by definition cannot be observed often and, as a consequence, are difficult if not impossible to learn by models. The ventral attention sub-system therefore detects untypical/unexpected features as deviation from the expected features, for which models can be learned. The learning of these models can be thought of as analogous to the learning of TD-weights for the appearance of objects for the TD-saliency in the dorsal attention system, but the ventral attention models are not specific for objects only.

The ventral attention sub-system may share the feature maps with the dorsal attention system. Note that the ventral attention system, even if operating on the same feature maps, processes them differently than the dorsal attention system. It also takes into account internal models about what are typical features, which the system can learn from experience. This makes it different from the BU-saliency in the dorsal attention system, which only has the feature maps, and also different from the TD-saliency in the dorsal attention system, which has expectations (or, a "model") about the appearance of objects that are important for the current task (i.e., which features are typical of the object(s) of interest, not which features are typical in general, for the situation the system is currently in).

The ventral attention has many expectations/models active in parallel, since it does not want to find a certain type of object but rather monitors whether one of the numerous models of typical features is being violated.

Besides the TD-saliency, the dorsal attention system contains the BU-saliency, which can detect "pop-out" stimuli (like a flashlight-siren, for example, or red traffic lights). This is also a very useful functionality, the ventral attention system would not necessarily detect or react to red traffic lights, because they are typical for traffic environments (an exception would be a previously green traffic light that suddenly turns red, for example).

The BU-saliency of the dorsal attention sub-system does detect stimuli in a different sense than the ventral attention system: While the ventral attention system has its internal models about typical features, in addition to the feature maps themselves, the BU-saliency only has the feature maps. Therefore, the BU-saliency is limited to the detection of "pop-out" stimuli, which is fundamentally different from the ventral attention system. In fact, we show an example of a situation where the ventral attention system is able to detect an unexpected stimulus that the BU-saliency cannot detect (an unexpected ball).

The attention system according to the invention all in all consists of three "saliencies" so to speak, the BU- and TD-saliencies being subsumed in the dorsal attention system, and a ventral sub-system.

An "unexpected" stimulus in the sense of the invention means a stimulus contradicting the internal models of the ventral attention system about what are typical features.

Example of Attentional Dynamics

It is assumed that the system is in a traffic environment and that it currently pursues the task of keeping the distance to the car in front. From experience, the system knows that this task involves the object category "car", the spatial prior "in front", and the behaviors "brake" and "accelerate". Leaving aside the behaviors in the following consideration, the system also knows from experience how to express the object category "car" in terms of the various feature maps, i.e. which features are characteristic for the object category "car" and which are not. The resulting top-down feature weights modulate the way the dorsal attention combines the feature maps (see FIG. 2, left). This leads to a saliency map in which cars are highly salient while other parts of the scene are not. Likewise, the system knows from experience how the spatial prior "in front" translates to 2D image space, which affects the saliency map by further increasing the saliency of cars in front while decreasing the saliency of cars in the periphery. As a result of the combined effect of top-down feature weights and spatial prior, the focus of attention is indeed on the car in front. The classification sub-system confirms this, and a stable state is achieved (see FIG. 2, right).

Now suppose that a ball rolls onto the street while the system is absorbed in its distance-keeping task. This unexpected event cannot be detected by the top-down saliency in the dorsal attention sub-system: The features that are characteristic for the object category "ball" differ significantly from those that are characteristic for cars, to which the top-down saliency is currently tuned because of the task. The bottom-up saliency in the dorsal attention sub-system can detect the ball, in principle, because it takes into account all the different feature maps that are available without being tuned to a certain subset thereof: Due to its motion and its contrast to the background, there is at least some activity corresponding to the ball. However, this activity is very limited and by no means outstanding compared to other parts of the scene, e.g. other traffic participants, which is a drawback of the bottom-up saliency's lack of specificity.

Moreover, due to the presence of the task, the influence of the bottom-up saliency map as a whole is significantly reduced at the moment, compared to the influence of the top-down saliency map, since it would otherwise distract the system from the task in progress. This phenomenon is known as change blindness [13].

In the ventral saliency map, in contrast, the moving ball causes a high degree of activity for two reasons: First, a ball rolling onto the street is an unexpected change in the system's environment that normally does not happen in traffic scenes like this. In particular, the direction of movement strongly contradicts the expectations of the system, which rather predict radial directions of movement, e.g. due to ego-motion and other traffic participants moving on the different lanes. Second, this unexpected change is highly relevant for the behavior of the system, because driving safely implies that the area in front of the car should be free, and the ball might be followed by a child running after it. Hence, the ball is highly salient in the ventral saliency map and thus triggers a reorienting response by firing the interrupt and providing the coarse spatial prior. Note that at this stage, neither the system nor even the ventral attention sub-system knows what triggered the reorienting response: The interrupt only tells the system that something did, and the coarse spatial prior to the dorsal attention sub-system provides a rough cue where to look for it.

The interrupt stops the current task of the system and, together with it, the influence of the corresponding top-down feature weights on the dorsal attention sub-system. Thus, the balance between top-down and bottom-up saliency is shifted in favor of the latter. Together with the coarse spatial prior provided by the ventral attention sub-system, the activity in the bottom-up saliency map that corresponds to the ball becomes outstanding now, compared to the other parts of the scene. As a consequence, the system's focus of attention is redirected to the ball. As soon as the classification sub-system recognizes it as a ball, the formerly unexpected stimulus has become something known. This marks the end of the reorienting response (see FIG. 3, left).

Afterwards, the ventral attention sub-system returns to its normal state. Depending on the implications the ball has for the system, different things may happen in the following: If the ball is of little importance to the system, e.g. because it is rolling away, the system may continue with the task that has been interrupted, focusing on the car in front again. If the ball has to be dealt with, e.g. because it is blocking the way, the system must set up the task to avoid it, thus focusing on the ball further. Moreover, if the system knows from experience that the ball might be followed by a child running after it, it is able to set up the task of actively looking for the expected child. In either case, with respect to the attentional dynamics, the system returns to a stable state like in FIG. 2, right, differing only in terms of the top-down feature weights that are involved now.

Implementation

Figure 4:
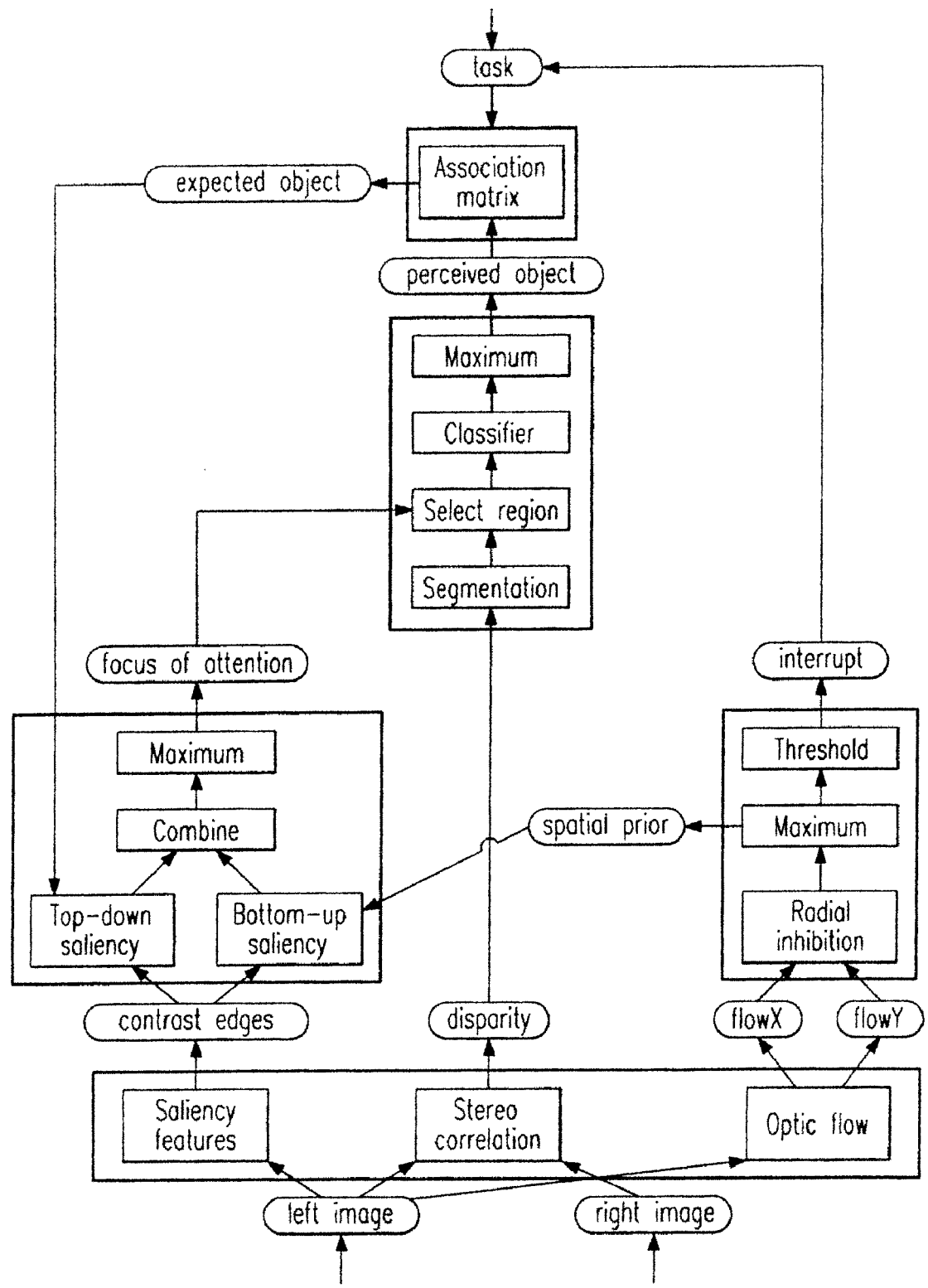

An overview of our technical system instance implementing the proposed architecture is depicted in FIG. 4. The large boxes correspond to the five sub-systems introduced in Sec. II, showing their implementation in greater detail. They are described in the following. All implementation has been done in C code and is embedded in the RTBOS/DTBOS framework for distributed real-time systems [14].

A. Image Processing

The input to our technical system instance as a whole, and in particular to the image processing sub-system, is a pair of color stereo images $$i_{left}, i_{right}: W \times H \to [0,1]^3.$$

The image processing sub-system consists of three parallel processing steps:
Saliency feature computation,
Stereo correlation, and
Optic flow computation.

The saliency feature computation operates on $i_{left}$ and calculates various feature maps, which are identical to those used in [7]. The features considered include intensity contrast edges and color contrast edges at different orientations and scales, and they can be further divided into on-off and off-on contrast edges. Each feature map concentrates on one of these features, and the value $f_j(x,y) \in [0,1]$ assigned to a pixel $(x,y) \in W \times H$ indicates the extent to which a contrast edge of the orientation, scale and type represented by fj is present at (x, y). Let $F \in \mathbb{N}$ denote the total number of feature maps fj.

The stereo correlation operates on both $i_{left}$ and $i_{right}$ and computes a disparity map $i_{disp}: W \times H \to \mathbb{Z}$, using a local correlation method [15]. The disparity map $i_{disp}$ assigns a disparity value $i_{disp}(x,y) \in \mathbb{Z}$ to each pixel, where disparity values $i_{disp}(x,y) \geq 0$ are values valid while disparity values $i_{disp}(x,y) < 0$ are invalid, while may occur due to correlation ambiguities within homogeneous image regions, for example. Invalid disparities are not processed any further.

The optic flow computation operates on ileft and also takes into account ileft from the previous timestep. From these two, it calculates the optic flow maps iflowX, iflowY:

$$W \times H \to \mathbb{Z}$$

employing the method described in [16].

Each pixel is assigned a velocity vector $$(i_{flowX}(x,y), i_{flowY}(x,y)) \in \mathbb{Z}^2$$

in image coordinates that indicates the displacement of pixel (with respect to the previous timestep. The velocity vector represents both the direction and the amplitude of the displacement.

All feature maps fj, idisp, iflowX and iflowY taken together represent the output of the image processing subsystem as a whole.

Dorsal Attention

The dorsal attention sub-system as a whole operates on the feature maps fj and consists of four processing steps:
Bottom-up saliency,
Top-down saliency,
Saliency combination, and
Maximum selection.

Except for bottom-up and top-down saliency which run in parallel, execution order is sequential. The implementation of the dorsal attention sub-system corresponds to the work presented in [7] and is briefly summarized in the following.

The bottom-up saliency combines the feature map to a single (bottom-up) saliency map $$s_{dorsal}^{BU}: W \times H \to [0,1]$$

by computing their weighted sum $$s_{dorsal}^{BU} = \Sigma_j w_j^{BU} f_j,$$

wherein the $w_j^{BU} \in [0,1]$ are the bottom-up feature weights corresponding to the fj, respectively. As opposed to the top-down feature weights $w_j^{TD}$ (see below), the $w_j^{BU}$ are specified in advance to have equal values $$w_j^{BU} = \frac{1}{F}$$

and are not changed at run-time. Thus, the bottom-up saliency $s_{dorsal}^{BU}(x,y) \in [0,1]$ or a pixel indicates the extent to which features represented by the feature map are present at the position (x, y) abstracting from the information which of the features are present.

The top-down saliency also combines the feature maps to a single (top-down) saliency map $$s_{dorsal}^{TD}: W \times H \to [0,1]$$

by computing their weighted sum $$s_{dorsal}^{TD} = \Sigma_j w_j^{TD} f_j,$$

where the $w_j^{TD} \in [0,1]$ are the tope-down feature weights corresponding to the fj, respectively. Unlike the $w_j^{BU}$, however, the $w_j^{TD}$ are not constant but can be dynamically changed at runtime.

In our case, the $w_j^{TD}$ defined by the expectation generation sub-system and indicate the extent to which the different fj are characteristic for the expected object category $c_{expected}$.

The two saliency maps are combined to a single saliency map $$s_{dorsal}: W \times H \to [0,1]$$

by computing their weighted sum.

The maximum selection then determines the pixel at which the dorsal saliency map has its maximum. This pixel then represents the system's current focus of attention and is the output of the dorsal attention sub-system as a whole.

Classification

The classification sub-system consists of four sequential processing steps:
Segmentation,
Region selection,
Classification, and
Maximum selection.

The classifier [17] is assumed to be pre-trained on various object categories c1, ..., cC that are typical for the domain considered, such as "cars", "pedestrians" and "traffic signs" in the car domain, for example. Remember that $C \in \mathbb{N}$ denotes the total number of object categories known to the system.

The maximum selection then makes a decision by determining the object category with the highest activation. The object category represents what the system is currently perceiving and is the output of the classification sub-system as a whole.

Expectation Generation

The expectation generation sub-system generates an expected object category based on the perceived object category or based on a task.

The expectation is then translated back from object level to feature level by a mapping. The resulting top-down feature weight set is then propagated to the dorsal attention sub-system.

E. Ventral Attention

The ventral attention sub-system as a whole operates on iflowX and iflowY and comprises three sequential processing steps:
  Radial inhibition,
  Maximum computation, and
  Thresholding.

The radial inhibition computes a ventral saliency map, based on iflowX and iflowY on the one hand and a radial motion model on the other hand. The radial motion model is defined by a center point in image coordinates and represents the expectation of the system that, in the car domain, the ego-motion of the system's own car leads to radial optic flow and that other traffic participants moving along the different lanes of the road do as well. Since this model predicts the optic flow best while driving along a straight road, our ventral attention sub-system transiently deactivates itself if it detects the presence of globally uniform optic flow. This is determined automatically from the displacement maps underlying the computation of iflowX and iflowY (see [16]) and is important for preventing false positives while following a curve or driving on a bumpy road.

Otherwise, the $s_{ventral}(x,y) \epsilon [0,1]$ are computed by comparing the velocity vector (iflowX(x, y), iflowY (x, y)) at pixel (x, y) to the vector (x-cX, y-cY), which represents the direction of the velocity vector as predicted by the radial motion model.

The maximum computation then determines the maximum activity, together with the position at which it occurs. This position represents the coarse spatial prior that will be propagated to the dorsal attention sub-system if a reorienting response is triggered.

A reorienting response is triggered when $s_{ventral}(q^*)$ exceeds a certain threshold. If so, $p_{unexpected}$ is sent to the dorsal attention sub-system and, at the same time, the interrupt is sent to the expectation generation sub-system, stopping the ongoing task and the influence of the top-down feature weight set by setting=0, thus shifting the balance in favor of the bottom-up saliency.

Examples of Application Areas for the Present Invention

Figure 5:
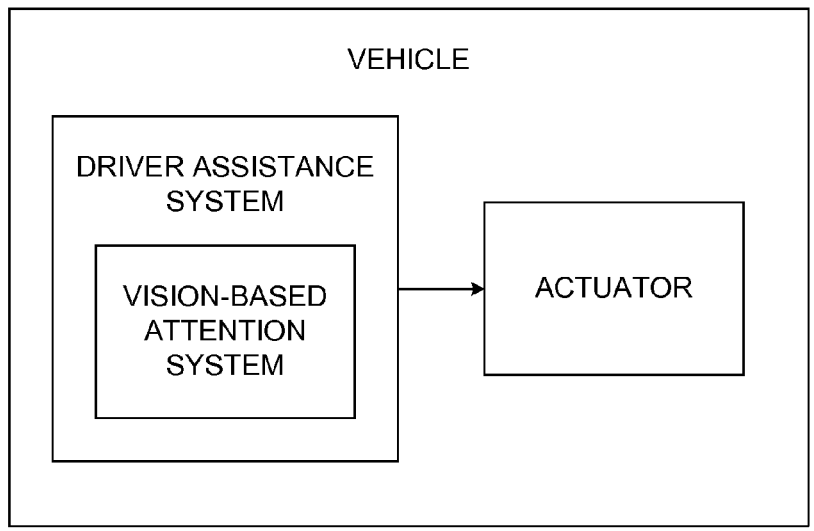
FIG. 5 illustrates a vehicle provided with a vision-based attention system.

1. Driver assistance systems operating in real-world cars: Invention enables car to detect unexpected but important situations that have to be dealt with (e.g. ball rolling onto street, car driving out of a gateway, . . . ). An embodiment of a vehicle provided with such driver assistance system is shown in FIG. 5. The driver assistance system is provided with a vision-based attention system. The driver assistance system generates an output signal for an actuator of the vehicle, such as, e.g., steering, breaking means and/or accelerating means.

Figure 6:
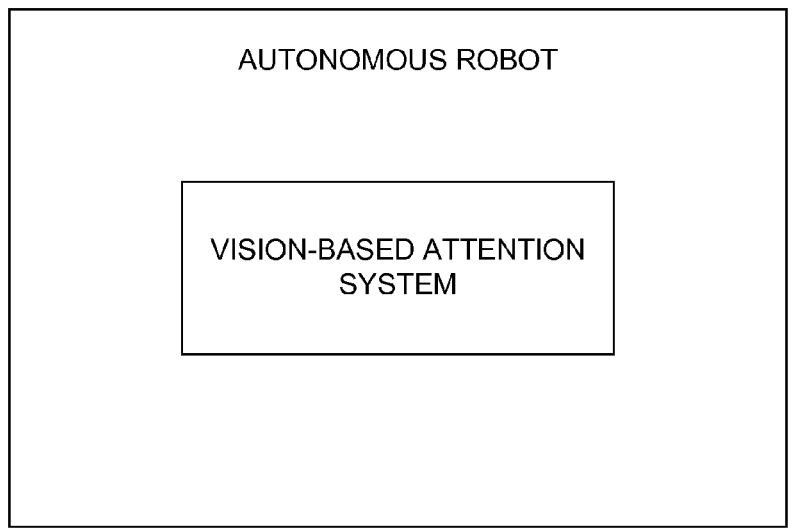
FIG. 6 illustrates an autonomous robot provided with a vision-based attention system.

2. Attention systems operating in real-world robots: Invention enables robot to detect unexpected events in its environment even while being absorbed in a task (e.g. person approaching while robot is absorbed in grasping object, . . . ). An embodiment of an autonomous robot provided with such attention system is shown in FIG. 6.

REFERENCES

[1] L. Itti, C. Koch, and E. Niebur, "A model of saliency-based visual attention for rapid scene analysis," IEEE Transactions on Pattern Analysis and Machine Intelligence, vol. 20, no. 11, pp. 1254-1259, 1998. [Online]. Available: http://citeseer.ist.psu.edu/itti98model.html

[2] L Itti, "Models of bottom-up attention and saliency", Neurobiology of Attention, 2005.

[3] F Orabona, G Metta, G Sandini, "Object-based visual attention: a model for a behaving robot", IEEE Computer Vision and Pattern Recognition—Workshops, 2005

[4] S J Park, J K Shin, M Lee, "Biologically inspired saliency map model for bottom-up visual attention", Lecture Notes in Computer Science, 2002-Springer

[5] W Kienzle, F A Wichmann, B Scholkopf, M O Franz, "A nonparametric approach to bottom-up visual saliency", Advances in neural information processing systems, 2007

[6] S J Park, S W Ban, J K Shin, M Lee, "Implementation of visual attention system using bottom-up saliency map model", Lecture notes in computer science, 2003

[7] D Gao, N Vasconcelos, "Bottom-up saliency is a discriminant process", IEEE International Conference on Computer Vision, 2007

[8] U Rutishauser, D Walther, C Koch, P Perona, "Is bottom-up attention useful for object recognition?", Computer Vision and Pattern Recognition, 2004. CVPR 2004

[9] S B Choi, S W Ban, M Lee, "Biologically motivated visual attention system using bottom-up saliency map and top-down inhibition", Neural Information Processing-Letters and Reviews, 2004

[10] V. Navalpakkam and L. Itti, "Modeling the influence of task on attention," Vision Research, vol. 45, no. 2, pp. 205-231, January 2005.

[11] A Oliva, A Torralba, M S Castelhano, J M Henderson, "Top-down control of visual attention in object detection", Image Processing, 2003. ICIP 2003

[12] S. Frintrop, VOCUS: A Visual Attention System for Object Detection and Goal-Directed Search (Lecture Notes in Computer Science/Lecture Notes in Artificial Intelligence). Secaucus, N.J., USA: Springer-Verlag New York, Inc., 2006.

[13] V Navalpakkam, L Itti, "A goal oriented attention guidance model", Lecture Notes in Computer Science, 2002

[14] R J Peters, L Itti, "Beyond bottom-up: Incorporating task-dependent influences into a computational model of spatial attention", CVPR 2007

[15] B Rasolzadeh, M Bjorkman, J O Eklundh, "An attentional system combining topdown and bottom-up influences", Lecture Notes in Computer Science, 2007, NUMB 4840, pages 123-140, SPRINGER-VERLAG

[16] M Cerf, J Harel, W Einhäuser, C Koch, "Predicting human gaze using, low-level saliency combined with face detection", Advances in neural information processing systems, 2008

[17] B Khadhouri, Y Demiris, "Compound effects of top-down and bottom-up influences on visual attention during action recognition", International Joint Conference on Artificial Intelligence, IJCAI, 2005

[18] T. Michalke, J. Fritsch, and C. Goerick, "Enhancing robustness of a saliency-based attention system for driver assistance," in The 6th Int. Conf. on Computer Vision Systems (ICVS'08), Santorini, Greece, 2008.

[19] J. Fritsch, T. Michalke, A. R. T. Gepperth, S. Bone, F. Waibel, M. Kleinehagenbrock, J. Gayko, and C. Goerick, "Towards a human-like vision system for driver assis-

[20] Itti, L. Baldi, P., "A Principled Approach to Detecting Surprising Events in Video", CVPR 2005, VOL 1, pages 631-637

[21] T Xu, Q Muhlbauer, S Sosnowski, K Kuhnlenz, M Buss, "Looking at the Surprise: Bottom-Up Attentional Control of an Active Camera System", Control, Automation, Robotics and Vision, ICARCV 2008

The invention claimed is:

1. A vision-based attention system, comprising:
    at least one vision sensor;
    at least one image processing module processing an output signal of the vision sensor in order to generate at least two two-dimensional feature maps f;
    a dorsal attention subsystem generating a first saliency map $s_{dorsal}$ on the basis of a combination of the at least two feature maps f and an expected object category $c_{expected}$, wherein the expected category $c_{expected}$ of the object defines features of the object making objects of the expected category $c_{expected}$ highly salient in the first saliency map $s_{dorsal}$ taking into account a spatial prior, the saliency map $s_{dorsal}$ indicating a focus of attention $p_{FoA}$ for a driver assistance system;
    a classification subsystem computing an estimated category $c_{perceived}$ of an object category C for an object corresponding to a visual appearance of a local image patch $R_{pFoA}$;
    an expectation generation subsystem generating an object category $c_{expected}$ from the estimated category $c_{perceived}$ and propagating the expected object category $c_{expected}$ to the dorsal attention subsystem to influence the way the feature maps f are combined to said first saliency map $s_{dorsal}$; and
    a ventral subsystem, independent from the dorsal attention subsystem, generating a second saliency map $s_{ventral}$ on the basis of the at least two feature maps, which are the same or different as the ones used for the dorsal attention subsystem, the second saliency map $s_{ventral}$ indicating a visual stimulus independent from the expected object category $c_{expected}$, wherein the ventral attention sub-system detects whether the visual stimulus contradicts the expected object category $c_{expected}$, generating an interrupt event for the dorsal attention subsystem thereby enabling the system to reorient the focus of attention to the unexpected visual stimulus by providing a coarse spatial prior $p_{unexpected}$ to the dorsal attention subsystem.

2. The system according to claim 1, wherein the unexpected visual stimulus is a visual stimulus in the input field of the vision sensor which remains after deleting from the input field of the vision sensor,
    visual stimuli which are predicted from a previous visual input and the sensed ego-motion of the system, and
    pre-stored models of visual stimuli, which can be learned to be expected.

3. The system according to claim 1, wherein the feature map of the ventral attention subsystem represents the optical flow of the vision sensor, the optical flow being a two dimensional map in which each pixel is assigned a velocity vector representing a motion between two different sampled images.

4. The system according to claim 1, wherein the ventral attention subsystem has a priority over the attention produced by the dorsal attention subsystem in case an unexpected stimulus is detected.

5. The system according to claim 1, wherein the unexpected visual stimuli stimulus in the second saliency map is detected based on the difference between the expected direction and the sensed direction of the optical flow.

6. The system according to claim 5, wherein the expected direction of the optical flow is a radial flow around a center point in the input field of the vision sensor.

7. The system according to claim 1, wherein the dorsal attention subsystem comprises a bottom-up saliency module.

8. The system according to claim 1, wherein the dorsal attention subsystem comprises a top-down saliency module.

9. The system according to claim 1, wherein the output of the dorsal attention subsystem is supplied to a classifier module.

10. A driver assistance system, being provided with an attention system according to claim 1.

11. A vehicle, being provided with a driver assistance system according to claim 10, wherein the driver assistance system generates an output signal for an actuator of at least one of a vehicle steering, braking means and accelerating means.

* * * * *